W. KOPERNIK.
POT LIFTER.
APPLICATION FILED MAY 7, 1920.

1,370,127.

Patented Mar. 1, 1921.

Inventor
W. Kopernik
By A. M. Wilson
Attorney

UNITED STATES PATENT OFFICE.

WINCENTY KOPERNIK, OF CHICAGO, ILLINOIS.

POT-LIFTER.

1,370,127.  Specification of Letters Patent.  Patented Mar. 1, 1921.

Application filed May 7, 1920. Serial No. 379,538.

*To all whom it may concern:*

Be it known that I, WINCENTY KOPERNIK, a citizen of Poland, residing at Chicago, in the county of Cook and State of Illinois, have invented certain new and useful Improvements in Pot-Lifters, of which the following is a specification.

The primary object of the invention is the provision of a lifter for pots and kettles whereby the same may be elevated and carried from one place to another in a heated condition without burning the hand of the person in charge of the same, the device possessing great strength and being inexpensive to manufacture.

A further object of the invention is the provision of a pot lifter adapted for readily grasping and holding the rim portion of a heated pot or kettle, the device being detachable therefrom at will and adapted to project laterally of the pot when positioned for use thereon.

With these general objects in view, the invention consists of the novel combination and arrangement of parts hereinafter more fully described in connection with the accompanying drawing and in which like reference characters designate corresponding parts throughout the several views.

Figure 1:
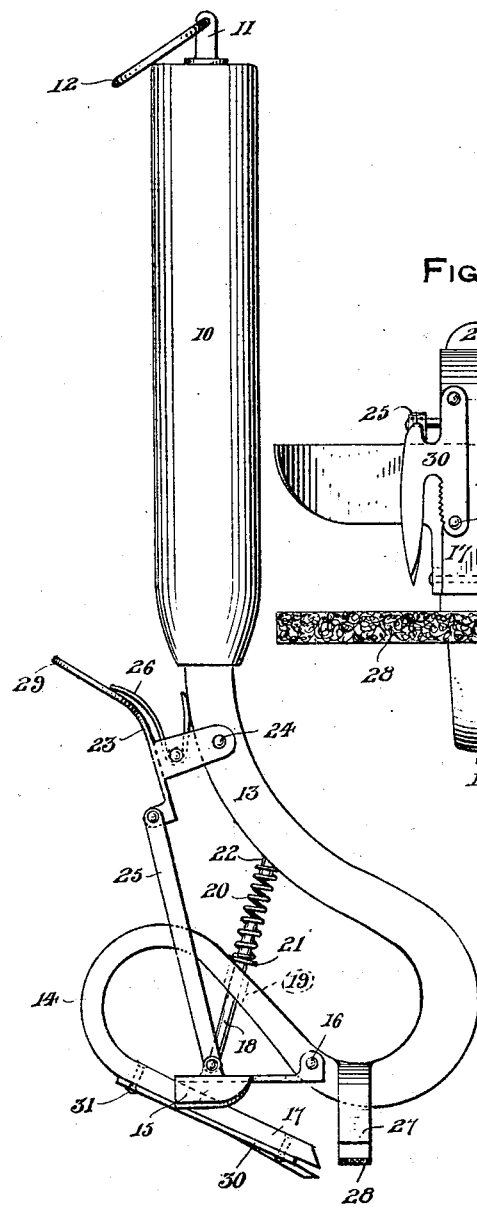
Figure 1 is a side elevational view of the device.
Figure 2:
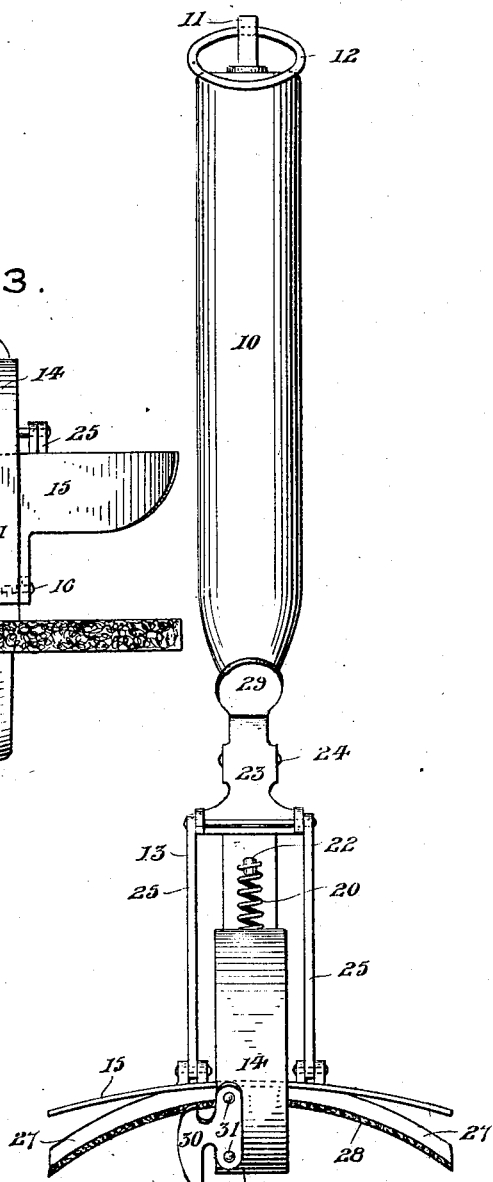
Fig. 2 is a front elevation of the same.
Figure 3:
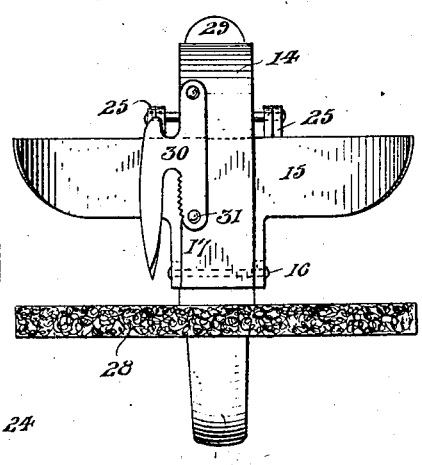
Fig. 3 is an end view thereof.

My invention provides a handle 10 of heat insulating material such as wood or fiber having a shank 11 secured axially therethrough with a ring 12 at one end of the shank outwardly of the handle while the main portion of the shank 11 projecting from the opposite end of the handle 10 is bent into substantially S-shape formation designated 13 designed for detachable engagement with a pot or kettle. The terminal loop or bend 14 of the shank portion 13 is adapted for fitting over the rim or upper edge of a kettle while a curved plate 15 pivoted as at 16 to the shank is adapted for engaging the exterior surface of the kettle bringing the inner face of the end portion 17 of the shank in holding contact with the inner surface of the kettle.

A pin 18 slidable through a perforation 19 in the shank loop 14 is resiliently pressed against the adjacent convexed side of the plate 15 by a coil spring 20 having one end seated upon a shoulder 21 carried by the pin 18 and its opposite end anchored to a lug 22 upon the opposite portion of the shank 13. An angular lever 23 pivoted to the shank 13 as at 24 is connected by parallel links 25 with the plate 15 at points on either side of the pin 18 and has a spring 26 to assist the spring 20 in normally maintaining the plate 15 positioned at the limit of its movement toward the shank portion 17. A curved cross piece 27 upon the shank 13 adjacent the pivot point 16 is faced with asbestos 28 and adapted to engage the outer surface of a kettle when the device is positioned upon the upper edge thereof.

The operation of the invention in grasping and lifting a pot or kettle will be understood from the foregoing description, the device being grasped by means of the handle 10 and the loop 14 fitted over the rim of the article to be carried while the thumb of the person may be firmly pressed against the end 29 of the lever 23 for holding the article firmly between the plate 15 and the shank portion 17, the cross piece 27 serving to steady the article being carried when grasped in the manner described. Upon swinging the lever 23 toward the handle 10, the device is released from the carried article and readily removed therefrom. A substantially T-shaped member 30 may be employed with the device as a tack puller or can opener if desired, the same being secured to the outer face of the shank portion 17 as by rivets 31. The device may be hung up when not in use by means of the ring 12 and the structure possesses great strength and is serviceable in lifting and carrying any articles that can be engaged between the plate 15 and shank portion 17.

While the form of the invention herein set forth is believed preferable it will be understood that minor changes may be made therein without departing from the spirit and scope of the invention.

What I claim as new is:—

1. A lifter comprising a handle, a substantially S-shaped shank projecting from one end thereof an arcuate plate pivoted to the terminal loop of the shank adapted for engaging articles between said plate and the terminal portion of the shank, a spring pressed pin slidably mounted through said terminal loop with one end engaging said plate, a spring pressed lever pivoted to the shank adjacent the handle, and connecting links pivoted between said lever and pins upon the plate at opposite sides of said pin.

2. A lifter comprising a handle, a substantially S-shaped shank projecting from one end thereof, an arcuate plate pivoted to the terminal loop of the shank adapted for engaging articles between said plate and the terminal portion of the shank, a spring pressed pin slidably mounted through said terminal loop with one end engaging said plate, a spring pressed lever pivoted to the shank adjacent the handle, connecting links pivoted between said lever and pins upon the plate at opposite sides of said pin, an arcuate cross head upon the shank adjacent the terminal loop adapted for engaging the surface of an article when positioned between said plate and the terminal portion of the shank during the operation of the device, a heat insulating facing for the concaved surface of the cross head, and a ring pivotally connected to the outer end of the handle.

In testimony whereof I affix my signature.

WINCENTY KOPERNIK.